US010737138B1

(12) United States Patent
Myrick

(10) Patent No.: US 10,737,138 B1
(45) Date of Patent: Aug. 11, 2020

(54) HANDLEBARS WITH REBOUNDING PUNCHING PADS FOR AN EXERCISE DEVICE

(71) Applicant: KI-ZEN Power Systems LLC, Portsmouth, VA (US)

(72) Inventor: Karla Myrick, Portsmouth, VA (US)

(73) Assignee: Ki-Zen Power Systems, LLC, Portsmouth, VA (US)

( * ) Notice: Subject to any disclaimer, the term of this patent is extended or adjusted under 35 U.S.C. 154(b) by 63 days.

(21) Appl. No.: 16/038,589

(22) Filed: Jul. 18, 2018

Related U.S. Application Data

(60) Provisional application No. 62/533,848, filed on Jul. 18, 2017.

(51) Int. Cl.
*A63B 23/04* (2006.01)
*A63B 22/06* (2006.01)
(Continued)

(52) U.S. Cl.
CPC ...... *A63B 23/0476* (2013.01); *A63B 22/0605* (2013.01); *A63B 69/24* (2013.01); *A63B 2225/09* (2013.01); *B62K 21/125* (2013.01)

(58) Field of Classification Search
CPC .. A63B 1/00; A63B 1/005; A63B 3/00; A63B 9/00; A63B 17/00; A63B 17/02; A63B 17/04; A63B 21/00047; A63B 21/00058; A63B 21/00069; A63B 21/00072; A63B 21/072; A63B 21/0722; A63B 21/0724; A63B 21/0726; A63B 21/08; A63B 21/15; A63B 21/159; A63B 21/16; A63B 21/4027; A63B 21/4033; A63B 21/4035; A63B 21/4039; A63B 21/4041; A63B 21/4047; A63B 21/4049; A63B 22/0046; A63B 22/0048; A63B 22/06; A63B 22/0605; A63B 2022/0635; A63B 22/0641; A63B 22/0647; A63B 22/0652; A63B 22/0658; A63B 69/16;
(Continued)

(56) References Cited

U.S. PATENT DOCUMENTS

D211,144 S  *  5/1968  Pawsat .................. D12/178
3,505,901 A  *  4/1970  Stone .................... B62K 21/16
                                                        74/551.4
(Continued)

*Primary Examiner* — Gary D Urbiel Goldner
(74) *Attorney, Agent, or Firm* — Blank Rome LLP

(57) ABSTRACT

A multi-level, multi-dimensional, and multi-directional handlebar for an exercise device is provided, the handlebar including optional rebounding and multi-positional punching pads. The handlebar can include first, second, and/or third handlebar portions extending from a transverse extension piece, each portion having left and right sections. Each section of each portion can include proximal, internal, and/or distal segments. The first, second, and/or third handlebar portions are rotatable relative to a longitudinal axis of the transverse extension piece, providing for multiple, user selected fixed angular positions of the handlebar portions relative to the transverse extension piece. Each of the proximal, internal, and/or distal segments can be longitudinally and rotatably adjusted relative to one another, then fixedly secured, providing the overall handlebar with multi-level, multi-dimensional, and multi-directional capability.

20 Claims, 5 Drawing Sheets

(51) Int. Cl.
*A63B 69/24* (2006.01)
*B62K 21/12* (2006.01)

(58) Field of Classification Search
CPC . A63B 69/161; A63B 69/162; A63B 2225/09; A63B 2225/093; B62K 21/00; B62K 21/12; B62K 21/125; B62K 21/16; B62K 21/18; B62K 21/22
See application file for complete search history.

(56) References Cited

U.S. PATENT DOCUMENTS

| | | | | |
|---|---|---|---|---|
| 3,529,490 | A * | 9/1970 | Humlong | B62K 21/12 74/551.1 |
| 4,023,436 | A * | 5/1977 | Dodge | B62K 21/16 74/551.3 |
| 4,503,729 | A | 3/1985 | Shimano | |
| 4,750,754 | A | 6/1988 | Lennon | |
| 4,873,886 | A * | 10/1989 | Renner | B62K 21/125 74/551.8 |
| 4,930,798 | A * | 6/1990 | Yamazaki | B62K 21/125 280/261 |
| 4,951,525 | A * | 8/1990 | Borromeo | B62K 21/125 280/261 |
| D323,805 | S * | 2/1992 | Giard, Jr. | 74/551.1 |
| 5,094,124 | A * | 3/1992 | Stonehouse | B62K 21/125 74/551.1 |
| 5,145,210 | A * | 9/1992 | Lennon | B62K 21/125 280/261 |
| 5,154,094 | A * | 10/1992 | Klieber | B62K 21/125 280/261 |
| 5,154,095 | A * | 10/1992 | Giard, Jr. | B62K 21/125 74/551.1 |
| 5,201,243 | A * | 4/1993 | Schneider | B62K 21/125 74/551.1 |
| 5,235,872 | A * | 8/1993 | Giard, Jr. | B62K 21/125 248/118 |
| 5,257,963 | A | 11/1993 | Comfort | |
| 5,353,663 | A * | 10/1994 | Samuelson | B62H 5/00 280/288.4 |
| 5,423,728 | A * | 6/1995 | Goldberg | A63B 22/0605 482/57 |
| 5,480,365 | A | 1/1996 | Lundin et al. | |
| 6,098,493 | A * | 8/2000 | Cortes | B62K 21/125 403/205 |
| 6,146,313 | A * | 11/2000 | Whan-Tong | A63B 22/001 482/51 |
| 6,374,697 | B1 * | 4/2002 | Brandl | B62K 21/16 29/428 |
| D473,273 | S | 4/2003 | Crawford et al. | |
| 6,612,970 | B2 | 9/2003 | Forcillo | |
| 6,793,608 | B2 | 9/2004 | Goldberg et al. | |
| D520,922 | S * | 5/2006 | Forcillo | D12/178 |
| 7,065,837 | B2 * | 6/2006 | Kruepke | A47L 11/4075 15/143.1 |
| 7,172,532 | B2 * | 2/2007 | Baker | A63B 22/0605 403/109.1 |
| 7,207,237 | B2 * | 4/2007 | Johnson | B62K 21/12 74/551.1 |
| 7,213,485 | B2 * | 5/2007 | Huang | B62K 21/125 74/551.1 |
| 7,226,393 | B2 * | 6/2007 | Baker | A63B 22/0605 280/288.3 |
| 7,364,533 | B2 * | 4/2008 | Baker | A63B 22/0605 248/408 |
| 7,490,531 | B2 | 2/2009 | Chen | |
| 7,641,600 | B2 * | 1/2010 | Bingham, Jr. | A63B 22/00 24/516 |
| D613,651 | S | 4/2010 | Gisbert | |
| 7,771,325 | B2 * | 8/2010 | Baker | A63B 22/0605 248/408 |
| 7,806,809 | B2 * | 10/2010 | Bingham, Jr. | A63B 21/225 24/515 |
| D634,378 | S | 3/2011 | Iverson et al. | |
| 7,908,940 | B2 * | 3/2011 | Naka | B62M 25/08 74/551.8 |
| 8,172,247 | B2 | 5/2012 | Weber et al. | |
| D682,756 | S | 5/2013 | LaPorte et al. | |
| 8,955,862 | B1 * | 2/2015 | Narrow | B62L 3/02 280/264 |
| 9,010,788 | B2 | 4/2015 | Toffaletti | |
| 9,254,410 | B1 * | 2/2016 | Mirza | A63B 21/0004 |
| D758,510 | S * | 6/2016 | Hsieh | D21/694 |
| 9,475,540 | B1 * | 10/2016 | Demay | B62K 21/125 |
| 9,833,654 | B1 * | 12/2017 | Gant | A63B 21/0724 |
| 2003/0130096 | A1 | 7/2003 | LaCroce | A63B 21/0724 482/106 |
| 2004/0248701 | A1 * | 12/2004 | Baker | A63B 22/0605 482/57 |
| 2004/0248702 | A1 * | 12/2004 | Baker | A63B 22/0605 482/57 |
| 2005/0044981 | A1 * | 3/2005 | Huang | B62K 21/125 74/551.8 |
| 2005/0183536 | A1 * | 8/2005 | Okada | B62J 11/00 74/551.1 |
| 2005/0268743 | A1 * | 12/2005 | Meng | B62K 21/12 74/551.8 |
| 2007/0039409 | A1 | 2/2007 | Meng | |
| 2007/0151403 | A1 | 7/2007 | Andrews et al. | |
| 2007/0281835 | A1 * | 12/2007 | Baker | A63B 22/0605 482/57 |
| 2008/0036170 | A1 * | 2/2008 | Vroomen | B62K 19/04 280/279 |
| 2008/0053266 | A1 * | 3/2008 | Smolik | B62J 11/00 74/551.8 |
| 2011/0258757 | A1 * | 10/2011 | Felt | B62K 21/125 2/411 |
| 2011/0261453 | A1 * | 10/2011 | Felt | B62K 21/125 359/481 |
| 2013/0069339 | A1 * | 3/2013 | Toffaletti | B62K 21/12 280/274 |
| 2016/0031510 | A1 * | 2/2016 | Serbinski | B62J 27/00 74/551.8 |
| 2016/0176468 | A1 * | 6/2016 | Poole | B62K 21/12 280/263 |

\* cited by examiner

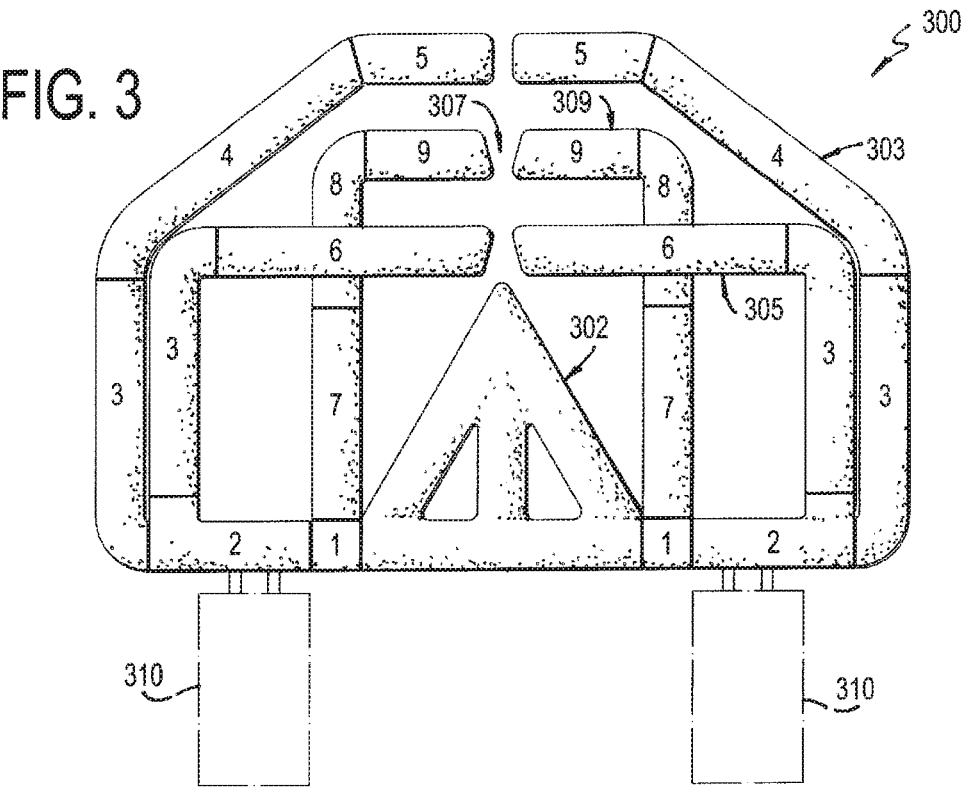
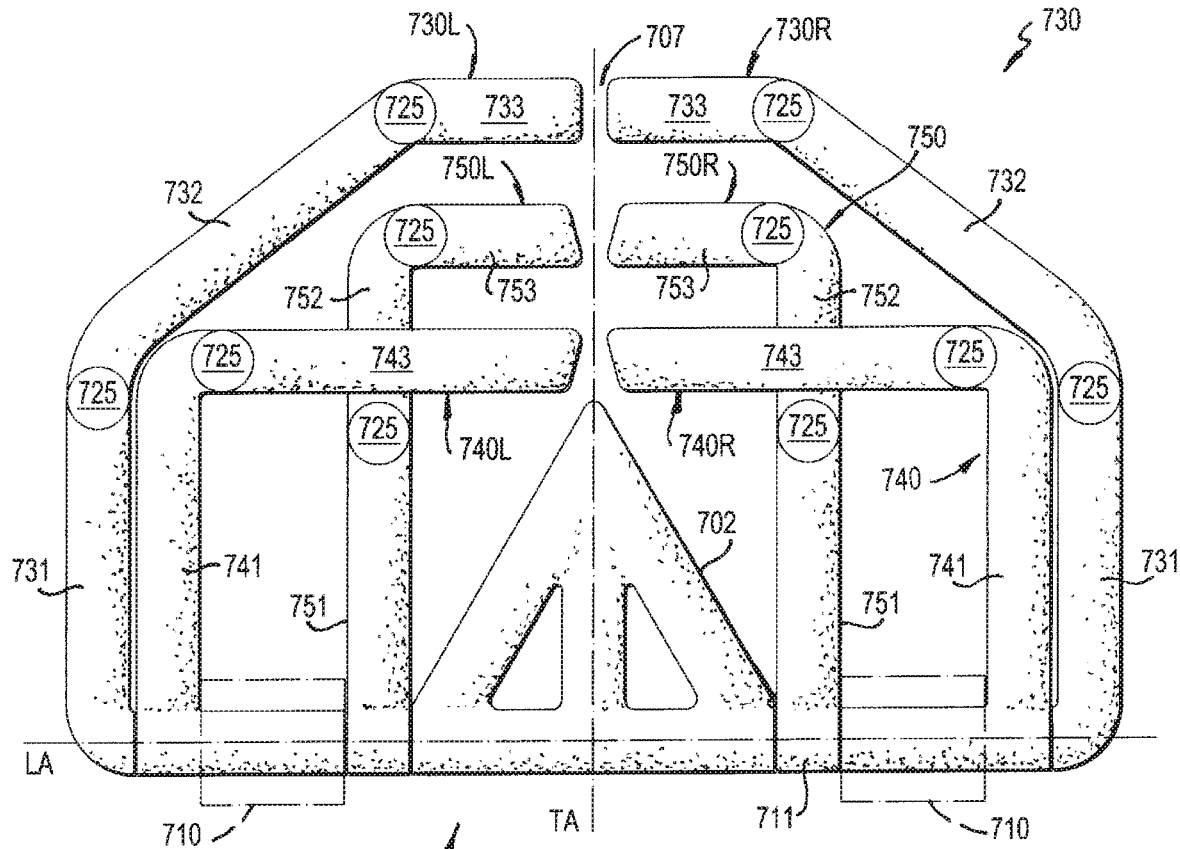

HANDLEBARS WITH REBOUNDING PUNCHING PADS FOR AN EXERCISE DEVICE

RELATED APPLICATION

This application claims benefit of priority of U.S. Provisional Application Ser. No. 62/533,848, filed Jul. 18, 2018; which application is incorporated herein by reference.

FIELD OF THE INVENTION

The present invention relates generally to work-out methods and exercise apparatus directed to stamina, endurance, coordination, balance, speed and power; and more particularly to specifically designed handlebars with rebounding punching pads for use on an exercise device.

BACKGROUND OF THE INVENTION

Although work-out regimens and exercise equipment are popular and widely available, very few offer both upper and lower body conditioning, simultaneous aerobic and anaerobic training, and fewer offer mixed activity for muscle confusion (i.e., providing varied muscle stress over time, by varying exercise, sets, repetitions and resistance, to avoid muscle accommodation.

SUMMARY OF THE INVENTION

The present invention provides bicycling (or use of another type of exercise device) for the lower body, various hand positioning on multi-level, multi-dimensional, and multi-directional handlebars while exercising (e.g., bicycling) for the upper body, punching bag training for the upper body in conjunction with various positional use of the handlebars, and a combination of the above, to add coordination, balance and agility to an otherwise directed speed, power and endurance work-out.

In one aspect, specifically designed, multi-level, multi-dimensional, and multi-directional handlebars, with optional rebounding punching pads are provided for use on an exercise device, such as a bicycle.

In one embodiment, a handlebar includes a transverse extension piece adapted to be connected to a stem of an exercise device at a midpoint of the transverse extension piece. The transverse extension piece has a longitudinal axis and a transverse axis symmetrically bisecting the transverse extension piece through the midpoint. The transverse axis is perpendicular to the longitudinal axis.

An embodiment of the handlebar can include a first handlebar portion having left and right sections, where each of the left and the right sections of the first handlebar portion have a proximal segment attached to the transverse extension piece on respective opposite ends of the transverse extension piece that extend at least forwardly relative to the transverse extension piece, generally in a direction of the transverse axis. Further, each of the left and the right sections of the first handlebar portion can have an internal segment attached to a forward end of the proximal segment that extends at least forwardly relative to the transverse extension piece. Each of the left and the right sections of the first handlebar portion can also have a distal segment attached to a forward end of the internal segment that extends at least inwardly toward the transverse axis.

An embodiment of the handlebar can also include a second handlebar portion having left and right sections, where each of the left and the right sections of the second handlebar portion have a proximal segment attached to the transverse extension piece inwardly of the respective opposite ends of the transverse extension piece that extend at least forwardly relative to the transverse extension piece, generally in a direction of the transverse axis. Further, each of the left and the right sections of the second handlebar portion can have a distal segment attached to a forward end of the proximal segment that extends at least inwardly toward the transverse axis.

An embodiment of the handlebar can also include a third handlebar portion having left and right sections, where each of the left and the right sections of the third handlebar portion have a proximal segment attached to the transverse extension piece inwardly of a point of attachment of each of the left and the right sections of the second handlebar portion with the transverse extension piece (and inwardly of the opposite ends of the transverse extension piece) that extend at least forwardly relative to the transverse extension piece, generally in a direction of the transverse axis. Further, each of the left and the right sections of the third handlebar portion can have an internal segment attached to a forward end of the proximal segment that extends at least forwardly relative to the transverse extension piece. Each of the left and the right sections of the third handlebar portion can have a distal segment attached to a forward end of the internal segment that extends at least inwardly toward the transverse axis.

In an embodiment of the handlebar, the distal segment of each of the left and the right sections of the first handlebar portion can be positioned above the distal segment of each of the left and the right sections of the second handlebar portion, which can be positioned above the distal segment of each of the left and the right sections of the third handlebar portion, all relative to a position of the transverse extension piece. In another embodiment, the internal segment of each of the left and the right sections of the first handlebar portion also extend inwardly toward the transverse axis.

In still another embodiment of the handlebar, the proximal segment of each of the left and the right sections of the first handlebar portion can extend parallel to the transverse axis. The internal segment of each of the left and the right sections of the first handlebar portion can extend 45 degrees inwardly relative to a longitudinal axis of the respective proximal segment, and the distal segment of each of the left and the right sections of the first handlebar portion can extend parallel to the transverse extension piece.

In a further embodiment of the handlebar, the proximal segment of each of the left and the right sections of the first handlebar portion can extend 10-12 degrees upwardly relative to the transverse axis. The internal segment of each of the left and the right sections of the first handlebar portion can extend 45 degrees inwardly relative to a longitudinal axis of the respective proximal segment, and the distal segment of each of the left and the right sections of the first handlebar portion can extend parallel to the transverse extension piece.

Any embodiment of the handlebar can further include a triangular shaped handlebar portion attached to the transverse extension piece, centrally located thereon, symmetrical about the transverse axis thereof. In one embodiment thereof, the attachment of the triangular shaped handlebar portion to the transverse extension piece is configured to provide rotatable adjustment about the longitudinal axis of the transverse extension piece. After adjustment, the triangular shaped handlebar portion can then be fixedly secured, providing a user selected angle of the triangular shaped handlebar portion relative to the transverse axis.

Any embodiment of the handlebar can further include at least one punching pad attached to the transverse extension piece. The attachment of the at least one punching pad to the transverse extension piece can provide rebounding capability (i.e., be configured to allow the punching pad to rebound upon being hit by a user). In one embodiment thereof, the attachment of the at least one punching pad to the transverse extension piece is configured to provide multiple fixed positions for the at least one punching pad, each position configured to allow the punching pad to rebound upon being hit by a user.

In a certain embodiment of the handlebar including the at least one punching pad, one of the multiple fixed positions of the at least one punching pad locates a side of the at least one punching pad aligned adjacent to a side of a proximal segment of the first handlebar portion. In another embodiment, one of the multiple fixed positions locates a longitudinal axis of the at least one punching pad perpendicularly relative to transverse axis.

In another embodiment of the handlebar, two punching pads are included, each attached to the transverse extension piece. In a two punching pad embodiment, each providing multiple fixed positions of attachment, one of the multiple fixed positions can locate each punching pad between the proximal segment of the first handlebar portion and the proximal segment of the second handlebar portion.

In yet another embodiment of the handlebar, the attachment of at least the proximal segments of each of the left and the right sections of the second and the third handlebar portions to the transverse extension piece are configured to provide rotatable adjustment about the longitudinal axis of the transverse extension piece, then fixed securement, providing a user selected angle of the respective proximal segment relative to the transverse axis. This embodiment could further include that the attachment of the proximal segment of each of the left and the right sections of the first handlebar portion to the transverse extension piece is also configured to provide rotatable adjustment about the longitudinal axis of the transverse extension piece, then fixed securement, providing a user selected angle of the respective proximal segment relative to the transverse axis.

In still another embodiment of the handlebar, the attachment of the distal segments of each of the left and the right sections of the first and the third handlebar portions to the internal segments of each of the left and the right sections of the first and the third handlebar portions are configured to provide longitudinal and radial adjustment therebetween, then fixed securement, providing a user selected multi-dimensional angle of the respective distal segment relative to the respective internal segment. In this embodiment, the internal segments of the left and the right section of the first handlebar portion extends 45 degrees relative to the transverse extension piece. Still further, or in the alternative, the attachment of the distal segment of each of the left and the right sections of the second handlebar portion to the proximal segment of each of the left and the right sections of the second handlebar portion can also be configured to provide longitudinal and radial adjustment therebetween, then fixed securement, providing a user selected multi-dimensional angle of the respective distal segment relative to the respective proximal segment.

In one aspect, a bicycle is provided, the bicycle including a frame, at least a pedal and/or wheel rotatably mounted to the frame, a seat connected to the frame, a stem extending from the frame forward of the seat, and any embodiment of a handlebar described above. The handlebar can be attached to the stem. In another aspect, a piece of exercise equipment is provided that includes a frame, at least one mechanism, movable under variable resistance, and movably mounted relative to the frame, a stem extending from the frame, and any embodiment of a handlebar described above. The handlebar can be attached to the stem.

BRIEF DESCRIPTION OF THE ILLUSTRATED EMBODIMENTS

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

FIG. 3 illustrates a top plan view of still another multi-level handlebar embodiment of the present invention, the handlebar embodiment having marked hand positioning locations for an exercise method of the present invention, the handlebar unit also including adjustable, foldable, rebounding pads, all in accordance with another embodiment of the invention;

Figure 6:
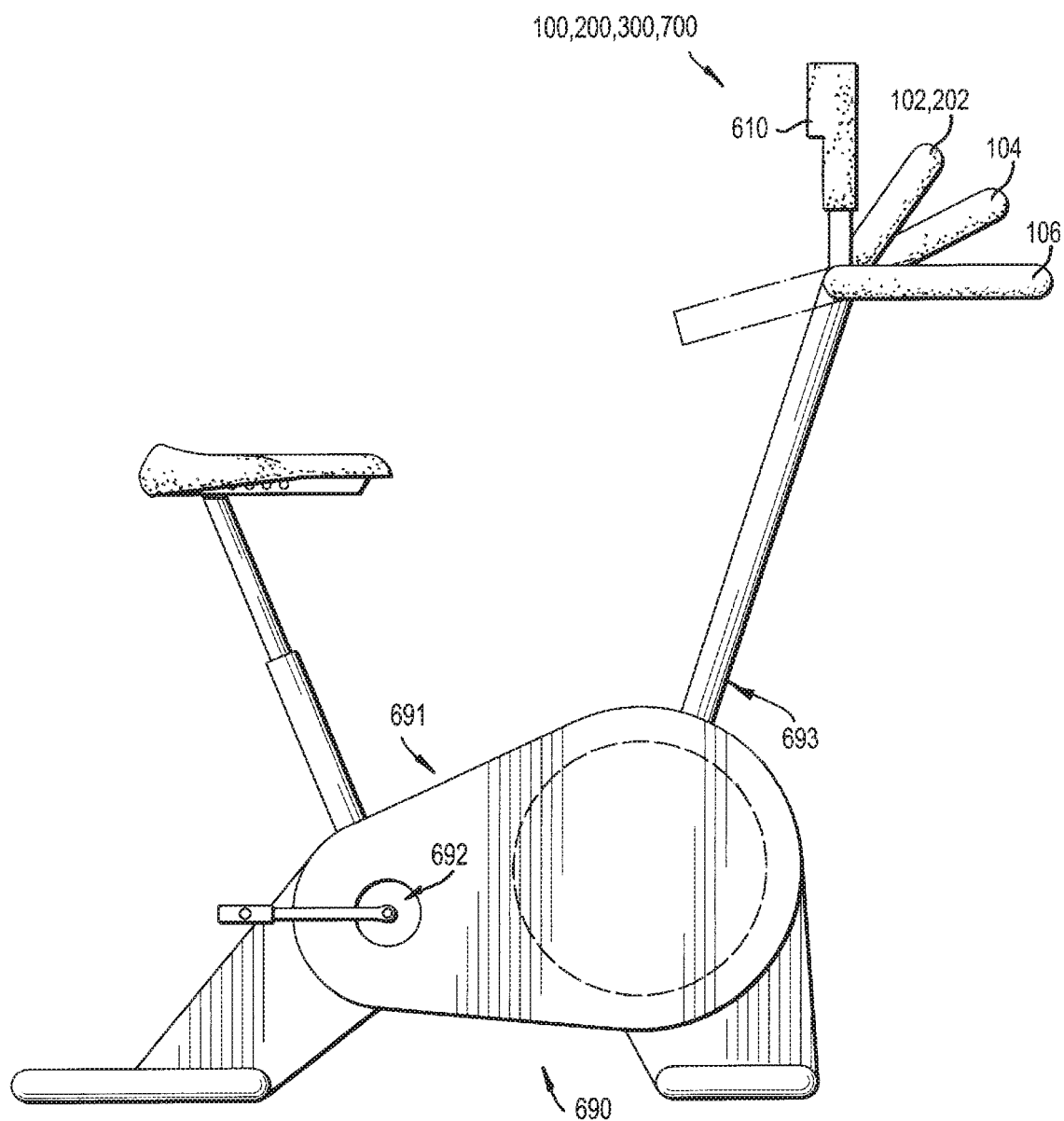

FIG. 6 illustrates a side view of a handlebar embodiment of the present invention, atop an exercise bicycle, the handlebar embodiment including adjustable, foldable, rebounding pads, shown extending vertically above the handlebar embodiment in a position for rebounding upon being hit (punched) during an exercise method; and FIG. 7 illustrates a top plan view of yet another multi-level, multi-dimensional and multi-directional handlebar embodiment of the present invention, the handlebar also optionally including adjustable, foldable, rebounding pads, all in accordance with another embodiment of the invention.

DETAILED DESCRIPTION OF THE ILLUSTRATED EMBODIMENTS

Certain terminology is used herein for convenience only and is not to be taken as a limitation on the invention. For example, words such as "upper," "lower," "left," "right," "horizontal," "vertical," "upward," "downward," "inward," and "outward" merely describe the configurations shown in the figures. Indeed, the components may be oriented in any direction and the terminology, therefore, should be understood as encompassing such variations unless specified otherwise.

The present invention provides methods and apparatus of bicycling (or use of another type of exercise equipment) for the lower body, various hand positioning on multi-level, multi-dimensional, and multi-directional handlebars while exercising for the upper body, punching pad training (in conjunction with use of the handlebars) for the upper body, and a combination of the above, to add coordination, balance and agility to an otherwise directed speed, power and endurance work-out.

The present invention includes various embodiments. In at least one embodiment, an exercise device (for example, a bicycle) comprises multi-level, multi-dimensional, and multi-directional handlebars, each level, portion, section and/or segment thereof having various shape defining, and different, hand positions for use while exercising. Each level, portion, section and/or segment of the handlebars can be adjustable, then fixed, in height and angle relative to the other levels, portions, sections and/or segments, and relative to a center position of the handlebar (in front of a user).

In another embodiment, the multi-level, multi-dimensional, and multi-directional handlebars further include one or more punching pads. The one or more punching pads (preferably two) are each connected to a portion of the handlebar. While fixably connected to a respective portion of the handlebar, each punching pad (or punching pad) can be set in one or more positions (preferably, vertically upward, horizontally, or vertically downward) in relation to the handlebars. In each of the set positions, the respective punching pad/bag would rebound when hit, movably absorbing the blow, but rebounding to the set position. The rebounding function could involve a biased spring (e.g., a multi-dimensional spring).

Figure 1:
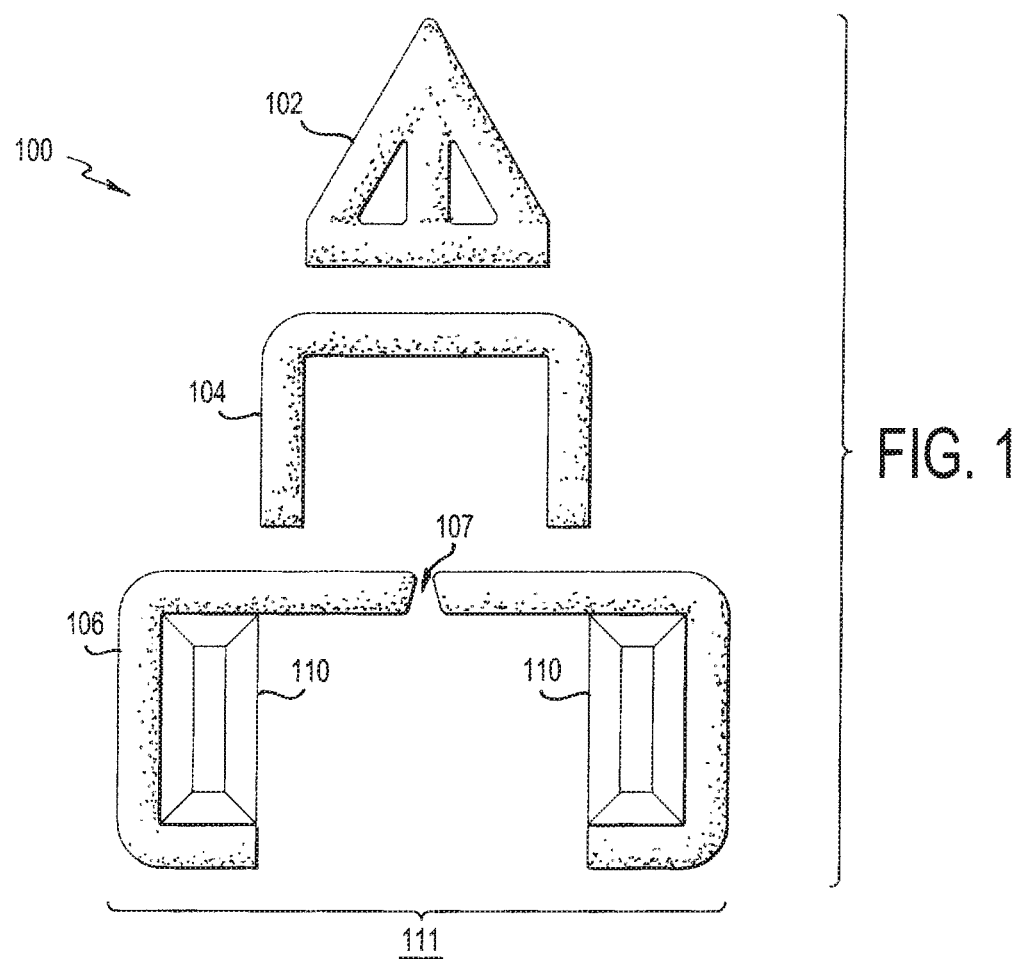
FIG. 1 illustrates a top plan, exploded view of various portions of a handlebar, defining various levels of a handlebar system, for an exercise device, in accordance with one embodiment of the present invention.
Figure 2:
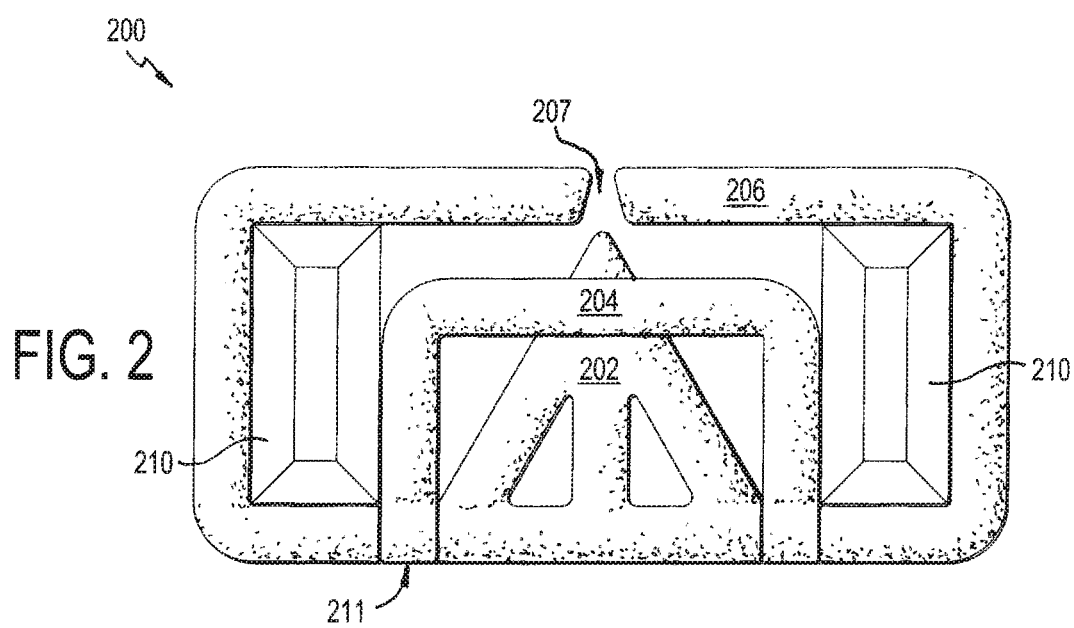
FIG. 2 illustrates a top plan view of the portions of a handlebar shown in FIG. 1, together as a handlebar unit for an exercise device, also including foldable, rebounding pads, in accordance with one embodiment of the present invention.

In one aspect, a handlebar 100, 200 includes three levels (for example, as shown in FIGS. 1 and 2). The first level could be a triangularly shaped handlebar portion 102, 202, perhaps for sprint portions of a work-out. The second level could be C-channel shaped handlebar portion 104, 204, and could be at a different height and angle than the first level (all relative to the exercise device, or to a center position of the handlebar (e.g., a transverse extension piece of the handlebar). The third level could be a rectangularly shaped handlebar portion 106, 206, perhaps with a break 107, 207 in an outer portion thereof to accommodate and provide for adjustment and angling of another portion (or level) of the handlebar therebetween. In another aspect, only one or two of the above levels are provided. Or, alternatively, four, five, or more levels may be provided. Further, as structurally and functionally detailed above, one or more punching pads 110, 210 could optionally be included, as shown.

In a certain aspect, the three levels (or three portions of the handlebar 100, 200) could be arranged one inside the other, as suggested by the exploded view of each level in FIG. 1. In this aspect, the three levels would be connected to one another (one inside another) along a common axis perpendicular to a longitudinal axis of the exercise device (thereby being across the front of the user) (e.g., a transverse extension piece 111, 211). In this aspect, each level would have angling capability relative to one another. In another aspect, each level has its own perpendicular bar (or transverse extension piece) across the front of the user, providing that each level could reside (in its entirety) at a different height (relative to the other levels), with separate and independent (or combined) connection to the exercise device. Or, two levels could be connected to one another (one inside another) along a common axis perpendicular to (across the front of) the user, and the third is separately connected to the exercise device at a different height. Or, any combination of the above could be employed. Further, in any connection embodiment, each level would be adjustable relative to the others (either in angle, height, or both, depending on the connection arrangement).

In another aspect, a differently shaped, multi-level, multi-dimensional, and multi-directional handlebar 300 embodiment is provided (for example, as shown in FIG. 3). In this embodiment, three levels are again provided. This embodiment also includes a centrally positioned, triangularly shaped portion 302. Another level, referred to as the first level in FIG. 3, could be arch shaped 303. The second level could be rectangularly shaped 305, could be at a different height and angle than the first level (all relative to the exercise device, or to a center position of the handlebar (e.g., a transverse extension piece of the handlebar), and could include a break 307. The third level could be square shaped 309 (also at a different angle and/or height). The first 303, second 305 and third 309 levels could include the break 307 in an outer portion thereof to accommodate and provide for adjustment and angling of another portion (or level) of the handlebar. In a further aspect, only one or two of the above shaped levels are provided. Or, alternatively, four, five, or more levels may be provided, in any of the shapes described thus far. The various connection arrangements described above, for the embodiment of FIGS. 1 and 2, could also apply to the FIG. 3 embodiment. Further, as structurally and functionally detailed above, one or more punching pads 310 could optionally be included, as shown.

As illustrated in the FIG. 3 embodiment, any handlebar embodiment could also include multiple hand position locations, each involving a differently shaped (and located) portion of a level of the handlebar. Each respective location, when a user places their hands thereon, results in a different splay (or different overall body positioning) of the user, resulting in a different core work-out. The FIG. 3 embodiment could display various color-coded (and/or single-digit numbered positions, as shown in FIG. 3), each of which would be called out during an exercise program, and perhaps would be associated with the music directing a particular exercise program.

In other embodiments, the various handlebar 100, 200, 300 embodiments detailed above, or any combination thereof, could also include one or more punching pads 110, 210, 310. The one or more punching pads 110, 210, 310 (preferably two) are each connected to a portion of the handlebar (as generally shown in FIG. 3). Any known mechanical means is sufficient for such connection.

Figure 5:
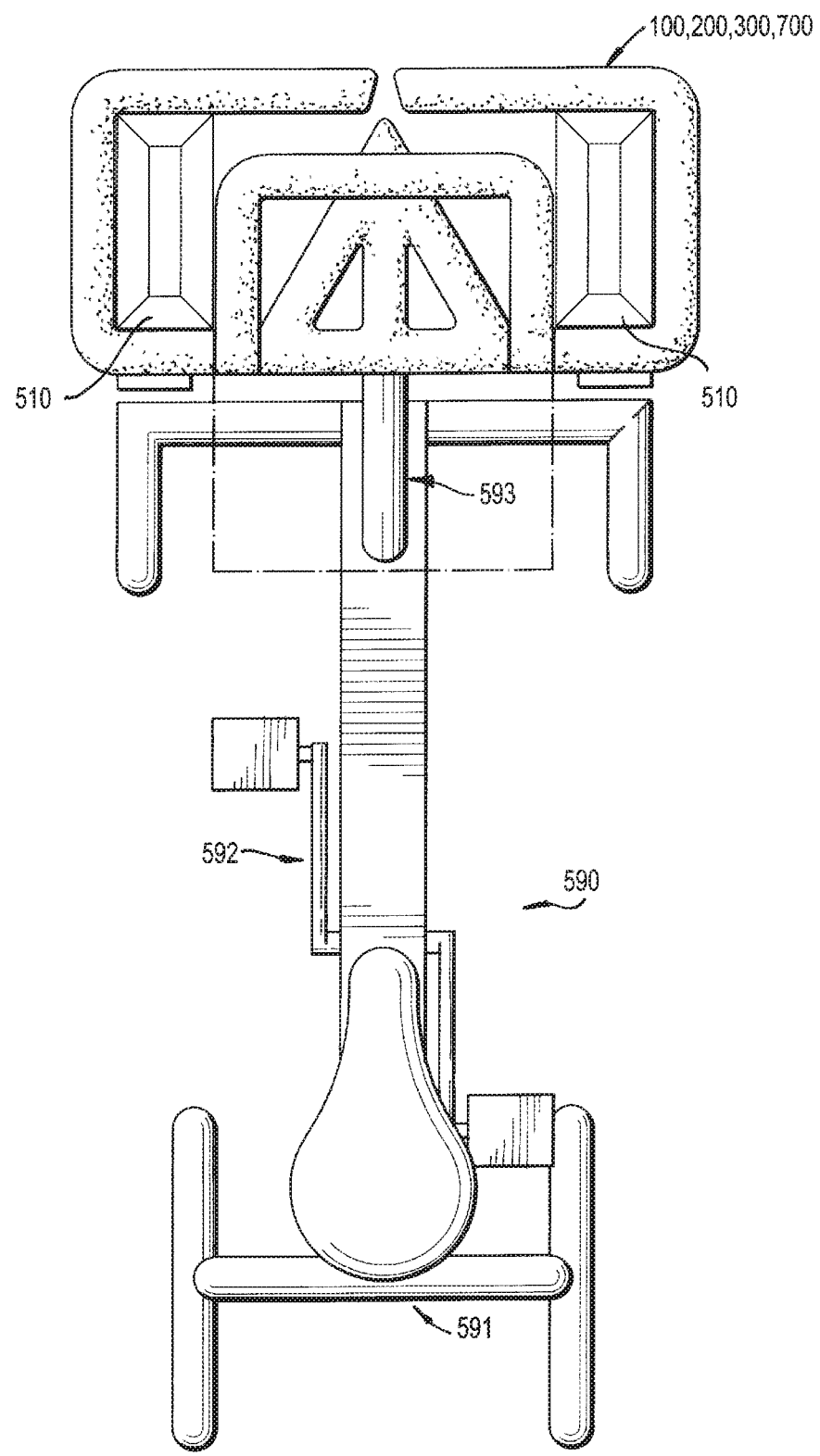
FIG. 5 illustrates a top plan view of another handlebar embodiment of the present invention, atop an exercise bicycle, the handlebar embodiment including adjustable, foldable, rebounding pads, shown in a horizontal position amongst the multi-level handlebar embodiment.

While fixably connected to a respective portion of the handlebar, each punching pad (or punching bag) 110, 210, 310 can be set in one or more positions (preferably, vertically upward, horizontally (facing forward or back), or vertically downward) in relation to the multi-level handlebars 100, 200, 300. Within (as a part of, or associated with) the mechanical connection to the respective handlebar portion, a quick-connect (e.g., a biased ball in socket; a ball joint with pin or friction locking (aka float and lock); or a slide or rocker and pin) can be used to move the punching pad between (and securely set the punching pad in each of) the one or more positions. FIG. 3 shows the punching pads 310 extending horizontally backward. FIG. 5 shows the punching pads 510 extending horizontally forward, nestled amongst the levels of the handlebar (which is normally a position of non-use). FIG. 6 shows the punching pads 610 extending vertically upward (which is normally the position for use). The punching pads can be of any shape, and of a cushioned material appropriate for boxing or martial arts use.

In each of the set positions, the respective punching pad would rebound when hit, movably absorbing a blow, but rebounding to the set position (in one or all of the set positions). The rebounding function could involve a biased spring, providing spring back to the set position up strike. The punching pads would provide a boxing, or martial arts type work-out for the upper body, while the lower body is otherwise exercising via use of the exercise device. Programmed punches, or strikes (whether a jab, cross and/or hook) are a part of a work-out regimen, where a user interchanges between striking the punching pads and grasping various hand positions on the multi-level handlebar.

Figure 4:
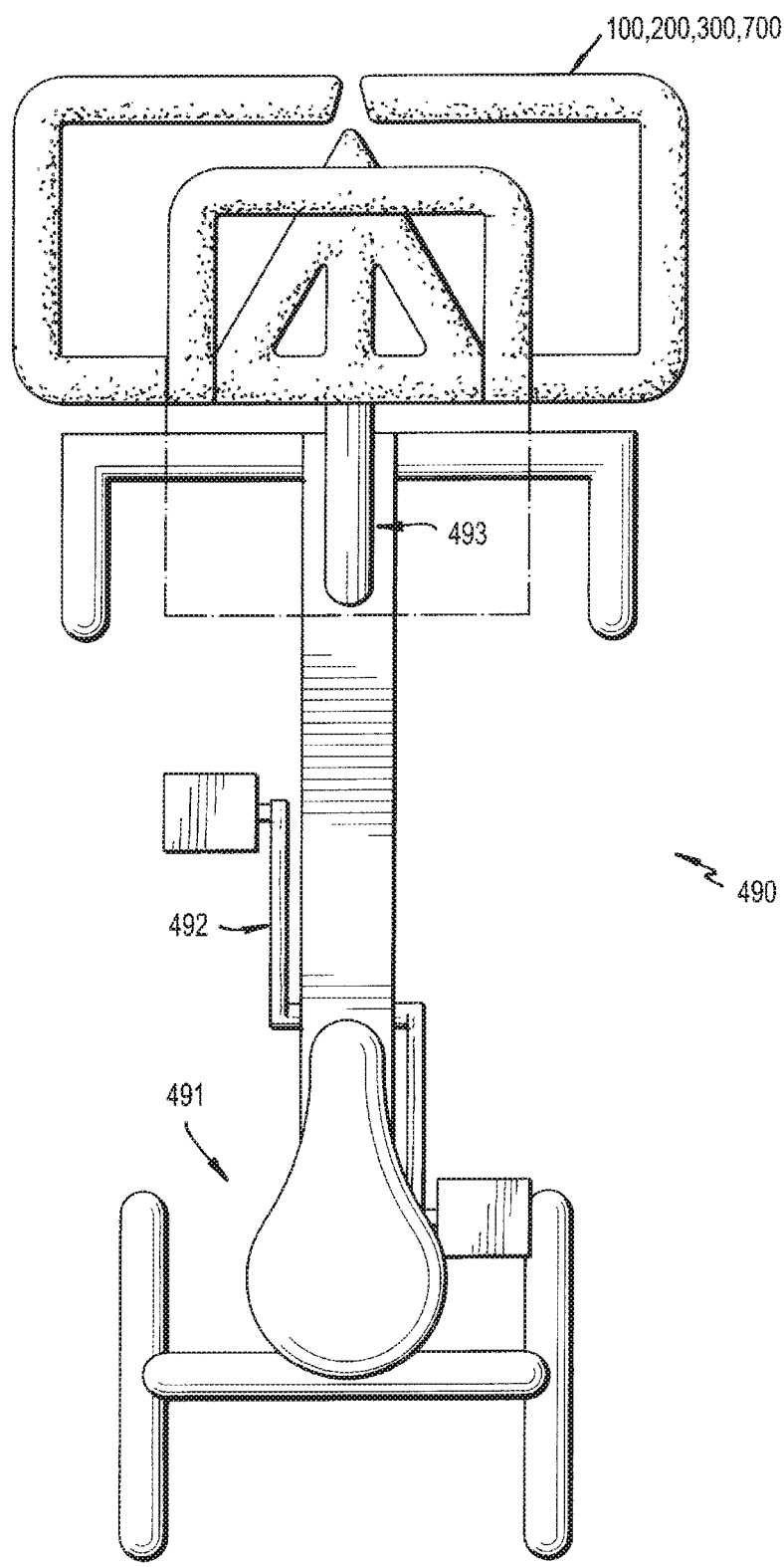
FIG. 4 illustrates a top plan view of a handlebar embodiment of the present invention atop an exercise bicycle.

FIGS. 4, 5 and 6 illustrate a various handlebar 100, 200, 300, 700 embodiment of the present invention on an exercise device 490, 590, 690 (e.g., a bicycle). Each piece of exercise equipment 490, 590, 690 includes a frame 491, 591, 691; at least one mechanism 492, 592, 692 movable under fixed or variable resistance, and movably mounted relative to the frame (e.g., at least a pedal and/or wheel, if a bicycle); a stem 493, 593, 693 extending from the frame; and the respective handlebar 100, 200, 300, 700 embodiment attached to the stem 493, 593, 693.

FIG. 7 illustrates yet another multi-level, multi-dimensional and multi-directional handlebar 700 embodiment of the present invention. The features and functionality described as included in the FIG. 7 embodiment are equally applicable to the prior handlebar 100, 200, 300 embodiments, where various permutations of features, functionality and uses of all of the handlebar embodiments 100, 200, 300, 700 are interchangeable.

In the FIG. 7 embodiment, the handlebar 700 includes a transverse extension piece 711 adapted to be connected to a stem of an exercise device at a midpoint of the transverse extension piece 711. The transverse extension piece 711 has a longitudinal axis LA and a transverse axis TA symmetrically bisecting the transverse extension piece 711 through the midpoint. The transverse axis TA is perpendicular to the longitudinal axis LA.

The handlebar 700 can include a first handlebar portion 730 having left 730L and right 730R sections, where each of the left 730L and the right 730R sections of the first handlebar portion 730 have a proximal segment 731 attached to the transverse extension piece 711 on respective opposite ends of the transverse extension piece 711 that extend at least forwardly relative to the transverse extension piece 711, generally in a direction of the transverse axis TA. A break 707 can exist between the left 730L and the right 730R sections of the first handlebar portion 730. Each of the left 730L and the right 731R sections of the first handlebar portion 730 can have an internal segment 732 attached to a forward end of the proximal segment 731 that extends at least forwardly relative to the transverse extension piece 711. Each of the left 730L and the right 730R sections of the first handlebar portion 730 can also have a distal segment 733 attached to a forward end of the internal segment 732 that extends at least inwardly toward the transverse axis TA.

The handlebar 700 can also include a second handlebar portion 740 having left 740L and right 740R sections, where each of the left 740L and the right 740R sections of the second handlebar portion 740 have a proximal segment 741 attached to the transverse extension piece 711 inwardly of the respective opposite ends of the transverse extension piece 711 that extend at least forwardly relative to the transverse extension piece 711, generally in a direction of the transverse axis TA. Each of the left 740L and the right 740R sections of the second handlebar portion 470 can have a distal segment 743 attached to a forward end of the proximal segment 741 that extends at least inwardly toward the transverse axis TA.

The handlebar 700 can also include a third handlebar portion 750 having left 750L and right 750R sections, where each of the left 750L and the right 750R sections of the third handlebar portion 750 have a proximal segment 751 attached to the transverse extension piece 711 inwardly of a point of attachment of each of the left 740L and the right 740R sections of the second handlebar portion 740 with the transverse extension piece 711 (and inwardly of the opposite ends of the transverse extension piece) that extend at least forwardly relative to the transverse extension piece 711, generally in a direction of the transverse axis TA. Further, each of the left 750L and the right 750R sections of the third handlebar portion 750 can have an internal segment 752 attached to a forward end of the proximal segment 751 that extends at least forwardly relative to the transverse extension piece 711. Each of the left 750L and the right 750R sections of the third handlebar portion 750 can have a distal segment 753 attached to a forward end of the internal segment 752 that extends at least inwardly toward the transverse axis TA.

In one aspect, the distal segment 733 of each of the left 730L and the right 730R sections of the first handlebar portion 730 can be positioned above the distal segment 743 of each of the left 740L and the right 740R sections of the second handlebar portion 740, which can be positioned above the distal segment 753 of each of the left 750L and the right 750R sections of the third handlebar portion 750, all relative to a position of the transverse extension piece 711. In another aspect, the internal segment 732 of each of the left 730L and the right 730R sections of the first handlebar portion 730 also extend inwardly toward the transverse axis TA.

In a further aspect, the proximal segment 732 of each of the left 730L and the right 730R sections of the first handlebar portion 730 can extend parallel to the transverse axis TA. The internal segment 732 of each of the left 730L and the right 730R sections of the first handlebar portion 730 can extend 45 degrees inwardly relative to a longitudinal axis of the respective proximal segment 731, and the distal segment 733 of each of the left 730L and the right 730R sections of the first handlebar portion 730 can extend parallel to the transverse extension piece 711.

In still another aspect, the proximal segment 731 of each of the left 730L and the right 730R sections of the first handlebar portion 730 can extend 10-12 degrees upwardly relative to the transverse axis TA. The internal segment 732 of each of the left 730L and the right 730R sections of the first handlebar portion 730 can extend 45 degrees inwardly relative to a longitudinal axis of the respective proximal segment 731, and the distal segment 733 of each of the left 730L and the right 730R sections of the first handlebar portion 730 can extend parallel to the transverse extension piece 711.

The handlebar 700 can further include a triangular shaped handlebar portion 702 attached to the transverse extension piece 711, centrally located thereon, symmetrical about the transverse axis TA thereof. In one aspect, the attachment of the triangular shaped handlebar portion 702 to the transverse extension piece 711 is configured to provide rotatable adjustment about the longitudinal axis LA of the transverse extension piece 711. After adjustment, the triangular shaped handlebar portion 702 can then be fixedly secured, providing a user selected angle of the triangular shaped handlebar portion 702 relative to the transverse axis TA.

The handlebar 700 can further include at least one punching pad (or punching bag) 710 attached to the transverse extension piece 711. The attachment of the at least one punching pad 710 to the transverse extension piece 711 can provide rebounding capability (i.e., be configured to allow the punching pad 710 to rebound upon being hit by a user). In one aspect, the attachment of the at least one punching pad 710 to the transverse extension piece 711 is configured to provide multiple fixed positions for the at least one punching pad 710, each position configured to allow the punching pad 710 to rebound upon being hit by a user.

In another aspect of the handlebar 700, the attachment of at least the proximal segments 741, 751 of each of the left and the right sections of the second 740 and the third 750 handlebar portions to the transverse extension piece 711 are configured to provide rotatable adjustment about the longitudinal axis LA of the transverse extension piece 711, then fixed securement, providing a user selected angle of the respective proximal segment 741, 751 relative to the transverse axis TA. This aspect could further include that the attachment of the proximal segment 731 of each of the left and the right sections of the first handlebar portion 730 to the transverse extension piece 711 is also configured to provide rotatable adjustment about the longitudinal axis LA of the transverse extension piece 711, then fixed securement, providing a user selected angle of the respective proximal segment 731 relative to the transverse axis TA.

In still another aspect of the handlebar 700, the attachment of the distal segments 733, 753 of each of the left and the right sections of the first 730 and the third 750 handlebar portions to the internal segments 732, 752 of each of the left and the right sections of the first 730 and the third 750 handlebar portions are configured to provide longitudinal and radial adjustment therebetween, then fixed securement, providing a user selected multi-dimensional angle of the respective distal segment 733, 753 relative to the respective internal segment 732, 752. This longitudinal and radial adjustment could be accomplished by a ball joint with pin or friction locking (aka float and lock), located at pivot points 725. In this aspect, the internal segment 732 of each of the left and the right sections of the first handlebar portion 730 can extend 45 degrees relative to the transverse extension piece 711.

Still further, or in the alternative, the attachment of the distal segments 743 of each of the left and the right sections of the second handlebar portion 740 to the proximal segments 741 of each of the left and the right sections of the second handlebar portion 740 can also be configured to provide longitudinal and radial adjustment therebetween, then fixed securement, providing a user selected multi-dimensional angle of the respective distal segment relative to the respective proximal segment. This functionality can also be applied to the attachment of the internal segments 732, 752 of each of the left and the right sections of the first 730 and the third 750 handlebar portions to the proximal segments 731, 751 of each of the left and the right sections of the first 730 and the third 750 handlebar portions, where each pivot point 725 is configured to provide longitudinal and radial adjustment therebetween, then fixed securement, providing a user selected multi-dimensional angle of the respective internal segment 732, 752 relative to the respective proximal segment 731, 751.

The present invention also involves exercise methods, and can be used in conjunction with personal training classes and certification training. The methods can involve rhythm and tempo, and can implement certain body positioning (e.g., the hand positioning detailed above on the various handlebar embodiments).

The exercise methods can bring musical sound and mathematics (e.g., all the elements of music, such as the form, rhythm, pitches, notes and tempo) to use as a motivation for learning new movements. For example, through a combination of numbers, a user can practice on specially designed handlebars of the present invention, the handlebars being used on any type of exercise device (e.g., a stationary bicycle, elliptical machine, or other lower body exercise equipment). These exercise methods use both sides of the brain, where a user learns while feeling the music; and, by it, can achieve the unachievable via fitness and sports as stimulation for the brain, body and spirit. The present invention involves mind and body development via guidance, in certain embodiments, through upper body movements, sequences and combinations of punches, each that challenge memory and recall. The exercise methods test balance coordination, stamina and endurance. As noted, various exercise devices are contemplated; for example, an elliptical machine, indoor cycling bike, or cardiovascular fitness machine in general. Patterns of numbers, in different sequences and color combinations, are provided by the instructor or coach, and are used in conjunction with different types of upper body movements, such as low impact push-ups with high repetition.

Benefits of the devices and methods of the present invention are:
Increased strength in the upper body and lower body areas.
Coordination improvement.
Posture improvement.
Breathing improvement.
Strengthening of the abdominal muscles.
Improvement of Self-Esteem
Overall improvement of health
Decrease the levels of body fat
Increase the level of cardiovascular performance
Increase overall muscular development, strength, and resistance
Improves flexibility and balance
Lower the levels of stress
Increased creativity & problem-solving skills
The ability to think faster
Increased recall, focus and concentration
Increased ability to multi-task
The ability to remain calm and focused during high-stress situations
Increased self-confidence
Using both sides of the brain
Slowing down the age process
Exemplary exercise methodologies of the present invention are:
POWER-CYCLE: Developing and increasing one's cardio, endurance, stamina, and coordination, while testing cognitive function, focus and memory;
POWER CYCLE-BOXING: Developing and increasing one's cardio, endurance, stamina and coordination, while using both sides of the brain, and while testing cognitive function, focus and memory; and
BOXING METHODOLOGIES: a unique combat methodology based on high spiritual level consecutively increasing one's body strength, power, focus, concentration, memory and overall performance, all directed to combat sport.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. For example, features detailed as included in certain specific embodiments above are recognized as interchangeable and possibly included in other detailed embodiments. Specific dimensions of any particular embodiment are described for illustration purposes only. It should therefore be understood that this invention is not limited to the particular embodiments described herein, but is intended to include all changes and modifications that are within the scope and spirit of the invention.

The invention claimed is:

1. A handlebar, comprising:
a transverse extension piece adapted to be connected to a stem of an exercise equipment at a midpoint of the transverse extension piece, the transverse extension piece having a longitudinal axis and a transverse axis symmetrically bisecting the transverse extension piece through the midpoint and perpendicular to the longitudinal axis;
a first handlebar portion having left and right sections;
each of the left and the right sections of the first handlebar portion having a proximal segment attached to the transverse extension piece on respective opposite ends of the transverse extension piece and extending at least forwardly relative to the transverse extension piece, generally in a direction of the transverse axis;
each of the left and the right sections of the first handlebar portion having an internal segment attached to a forward end of the proximal segment and extending at least forwardly relative to the transverse extension piece; and
each of the left and the right sections of the first handlebar portion having a distal segment attached to a forward end of the internal segment and extending at least inwardly toward the transverse axis;
a second handlebar portion having left and right sections;
each of the left and the right sections of the second handlebar portion having a proximal segment attached to the transverse extension piece inwardly of the respective opposite ends of the transverse extension piece and extending at least forwardly relative to the transverse extension piece, generally in a direction of the transverse axis; and
each of the left and the right sections of the second handlebar portion having a distal segment attached to a forward end of the proximal segment and extending at least inwardly toward the transverse axis; and
a third handlebar portion having left and right sections;
each of the left and the right sections of the third handlebar portion having a proximal segment attached to the transverse extension piece inwardly of a point of attachment of each of the left and the right sections of the second handlebar portion with the transverse extension piece and extending at least forwardly relative to the transverse extension piece, generally in a direction of the transverse axis;
each of the left and the right sections of the third handlebar portion having an internal segment attached to a forward end of the proximal segment and extending at least forwardly relative to the transverse extension piece; and
each of the left and the right sections of the third handlebar portion having a distal segment attached to a forward end of the internal segment and extending at least inwardly toward the transverse axis.

2. The handlebar of claim 1, wherein the distal segment of each of the left and the right sections of the first handlebar portion is positioned above the distal segment of each of the left and the right sections of the second handlebar portion, which is positioned above the distal segment of each of the left and the right sections of the third handlebar portion, all relative to a position of the transverse extension piece.

3. The handlebar of claim 1, wherein the internal segment of each of the left and the right sections of the first handlebar portion further extends inwardly toward the transverse axis.

4. The handlebar of claim 1, wherein:
the proximal segment of each of the left and the right sections of the first handlebar portion extends parallel to the transverse axis;
the internal segment of each of the left and the right sections of the first handlebar portion extends 45 degrees inwardly relative to a longitudinal axis of the respective proximal segment; and
the distal segment of each of the left and the right sections of the first handlebar portion extends parallel to the transverse extension piece.

5. The handlebar of claim 1, wherein:
the proximal segment of each of the left and the right sections of the first handlebar portion extends 10-12 degrees upwardly relative to the transverse axis;
the internal segment of each of the left and the right sections of the first handlebar portion extends 45 degrees inwardly relative to a longitudinal axis of the respective proximal segment; and
the distal segment of each of the left and the right sections of the first handlebar portion extends parallel to the transverse extension piece.

6. The handlebar of claim 1, further comprising a triangular shaped handlebar portion attached to the transverse extension piece, centrally located thereon, symmetrically about the transverse axis thereof.

7. The handlebar of claim 6, wherein the attachment of the triangular shaped handlebar portion to the transverse extension piece is configured to provide rotatable adjustment about the longitudinal axis of the transverse extension piece, then fixed securement, providing a user selected angle of the triangular shaped handlebar portion relative to the transverse axis.

8. The handlebar of claim 1, further comprising at least one punching pad attached to the transverse extension piece, the attachment of the at least one punching pad to the transverse extension piece is configured to allow the at least one punching pad to rebound upon being hit by a user.

9. The handlebar of claim 8, wherein the attachment of the at least one punching pad to the transverse extension piece is configured to provide multiple fixed positions for the at least one punching pad, each one of the multiple fixed positions configured to allow the at least one punching pad to rebound upon being hit by the user.

10. The handlebar of claim 9, wherein one of the multiple fixed positions locates a side of the at least one punching pad aligned adjacent to a side of a proximal segment of the first handlebar portion.

11. The handlebar of claim 9, wherein one of the multiple fixed positions locates a longitudinal axis of the at least one punching pad perpendicularly relative to the transverse axis.

12. The handlebar of claim 11, wherein two of the at least one punching pad are attached to the transverse extension piece.

13. The handlebar of claim 12, wherein one of the multiple fixed positions locates each of the at least one punching pad between the proximal segment of the first handlebar portion and the proximal segment of the second handlebar portion.

14. The handlebar of claim 1, wherein the attachment of at least the proximal segments of each of the left and the right sections of the second and the third handlebar portions to the transverse extension piece are configured to provide rotatable adjustment about the longitudinal axis of the transverse extension piece, then fixed securement, providing a user selected angle of the respective proximal segment relative to the transverse axis.

15. The handlebar of claim 14, further comprising that the attachment of the proximal segment of each of the left and the right sections of the first handlebar portion to the transverse extension piece is also configured to provide rotatable adjustment about the longitudinal axis of the transverse extension piece, then fixed securement, providing a user selected angle of the respective proximal segment relative to the transverse axis.

16. The handlebar of claim 1, wherein the respective attachment of the distal segments of each of the left and the right sections of the first and the third handlebar portions to the internal segments of each of the left and the right sections of the first and the third handlebar portions are configured to provide longitudinal and radial adjustment therebetween, then fixed securement, providing a user selected multi-dimensional angle of the respective distal segment relative to the respective internal segment.

17. The handlebar of claim 16, wherein the internal segment of each of the left and the right sections of the first handlebar portion extends 45 degrees relative to the transverse extension piece.

18. The handlebar of claim 16, wherein the attachment of the distal segments of each of the left and the right sections of the second handlebar portion to the proximal segments of each of the left and the right sections of the second handlebar portion is also configured to provide longitudinal and radial adjustment therebetween, then fixed securement, providing a user selected multi-dimensional angle of the respective distal segment relative to the respective proximal segment.

19. A bicycle, comprising:
a frame;
at least one pedal rotatably mounted relative to the frame;
a seat connected to the frame;
a stem extending from the frame forward of the seat; and
the handlebar of claim 1 attached to the stem.

20. A piece of exercise equipment, comprising:
a frame;
at least one mechanism, movable under fixed or variable resistance, and movably mounted relative to the frame;
a stem extending from the frame; and
the handlebar of claim 1 attached to the stem.

* * * * *